United States Patent
Van Oost et al.

(10) Patent No.: US 10,122,579 B2
(45) Date of Patent: Nov. 6, 2018

(54) AUTOMATIC RECONFIGURATION OF NETWORK DEVICES

(71) Applicant: THOMSON LICENSING, Issy de Moulineaux (FR)

(72) Inventors: Koen Van Oost, Borsbeek (BE); Frederik Verwaest, Mol (BE)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 150 days.

(21) Appl. No.: 14/650,732

(22) PCT Filed: Dec. 2, 2013

(86) PCT No.: PCT/EP2013/075248
§ 371 (c)(1),
(2) Date: Jun. 9, 2015

(87) PCT Pub. No.: WO2014/090622
PCT Pub. Date: Jun. 19, 2014

(65) Prior Publication Data
US 2016/0191315 A1    Jun. 30, 2016

(30) Foreign Application Priority Data
Dec. 11, 2012   (EP) ................................. 12306562

(51) Int. Cl.
*G06F 15/177*   (2006.01)
*H04L 12/24*    (2006.01)
(Continued)

(52) U.S. Cl.
CPC ...... *H04L 41/0816* (2013.01); *H04L 41/0856* (2013.01); *H04L 65/4076* (2013.01);
(Continued)

(58) Field of Classification Search
CPC ............ H04L 41/0816; H04L 41/0856; H04L 65/4076; H04L 67/303
(Continued)

(56) References Cited

U.S. PATENT DOCUMENTS 7,380,025 B1   5/2008  Riggins et al.
7,970,914 B2   6/2011  Bowen et al.
(Continued)

FOREIGN PATENT DOCUMENTS

EP   2383935      11/2011
JP   2012217047   11/2012
(Continued)

OTHER PUBLICATIONS

Zhang et al.: "A SoC Design for Broadband Wireless Ad-hoc Network Node"; Information Management and Engineering (ICIME), 2010 The 2nd IEEE International Conference on Apr. 16-18, 2010; pp. 496-499.
(Continued)

*Primary Examiner* — Alan S Chou
(74) *Attorney, Agent, or Firm* — Joseph J. Opalach

(57) ABSTRACT

A solution for automatic reconfiguration of network devices adapted to switch from the role of access point to the role of station and vice versa. In order to prepare a first network device for automatic configuration in the network, a profile of a second network device connected to said first network device via a network is received. The profile comprises access point credentials of the second network device. The received profile is compared with existing profiles stored in a memory of said first network device and is stored in said memory, if necessary. In case at a later time a role change of the first network device is determined, the stored profile is retrieved from the memory and used for connecting the first network device to the second network device.

9 Claims, 5 Drawing Sheets

(51) Int. Cl.
  *H04W 12/04* (2009.01)
  *H04L 29/06* (2006.01)
  *H04L 29/08* (2006.01)
  *H04W 84/12* (2009.01)

(52) U.S. Cl.
  CPC .......... *H04L 67/303* (2013.01); *H04W 12/04* (2013.01); *H04W 84/12* (2013.01)

(58) Field of Classification Search
  USPC ........................................................ 709/221
  See application file for complete search history.

(56) References Cited

U.S. PATENT DOCUMENTS

| | | |
|---|---|---|
| 2006/0069760 A1 | 3/2006 | Yeap et al. |
| 2006/0182075 A1 | 8/2006 | Brunner et al. |
| 2007/0079113 A1 | 4/2007 | Kulkarni et al. |
| 2008/0112363 A1* | 5/2008 | Rahman ............... H04W 8/005 370/331 |
| 2011/0317603 A1 | 12/2011 | Ruiz Lopez et al. |
| 2012/0213158 A1 | 8/2012 | Birlik et al. |
| 2012/0254022 A1 | 10/2012 | Kimura et al. |
| 2012/0287817 A1 | 11/2012 | Yamaguchi |
| 2013/0343350 A1* | 12/2013 | Weinrib ............... H04B 7/2643 370/336 |

FOREIGN PATENT DOCUMENTS

| | | |
|---|---|---|
| WO | WO0161965 | 8/2001 |
| WO | WO2006133383 | 12/2006 |
| WO | WO2008044877 | 4/2008 |

OTHER PUBLICATIONS

Lin et al.: "A Dynamic Topology Switch for the Emulation of Wireless Mobile Ad Hoc Networks"; Local Computer Networks, 2002. Proceedings. LCN 2002. 27th Annual IEEE Conference on Nov. 6-8, 2002; pp. 791-798.

Connectblue: "Wireless LAN Rugged Ethernet Port Adapter RWE241i"; Found with Google-ConnectBlue; Product Brief; Jan. 1, 2012; pp. 1-2.

Search Report dated Mar. 12, 2014.

* cited by examiner

AUTOMATIC RECONFIGURATION OF NETWORK DEVICES

This application claims the benefit, under 35 U.S.C. § 365 of International Application PCT/EP2013/075248, filed Dec. 2, 2013, which was published in accordance with PCT Article 21(2) on Jun. 19, 2014 in English and which claims the benefit of European patent application No. 12306562.5, filed Dec. 11, 2012.

FIELD OF THE INVENTION

The invention relates to a solution for automatic reconfiguration of network devices adapted to operate in two different roles in a network. More specifically, the invention addresses a credential recovery and auto-provisioning mechanism, which ensures that after a reconfiguration of the network the network remains operational.

BACKGROUND OF THE INVENTION

Today, especially due to the delivery of multimedia services over Wi-Fi, more and more equipment is being connected to the in house WLAN (WLAN: Wireless Local Area Network). However, a lot of devices do not yet have the necessary hardware "on board" to be able to connect to the WLAN, but simply connect on Ethernet. Hence there is a booming demand for Wi-Fi-to-Ethernet boxes that allow easy connection of the Ethernet devices to the WLAN. One of the reasons that a lot of devices deliberately choose not to integrate WLAN hardware is because of the high pace with which the underlying 802.11 technology is evolving. While it took 802.11bg roughly ten years to get to a mature market, 802.11n rose to popularity in three years only to be followed-up by 802.11ac in 2013. Practically this means that devices embedding Wi-Fi technology have the chance to get obsolete or at least less popular quite fast. This puts a lot of pressure on the product cost, motivating stand-alone Wi-Fi-to-Ethernet boxes.

From a production cost point of view, a device manufacturer is interested in building the most versatile product in order to spend as little as possible on hardware tooling, i.e. production line, test software, etc., and as little as possible on logistic costs, e.g. caused by different product codes, different order numbers, software, required storage space, etc. Hence a single Wi-Fi-to-Ethernet device capable of being both AP and STA (AP: Access Point; STA: Station) is often realized, keeping production and logistic costs low. For ease of use, all devices receive AP credentials, which guaranties strong security. End users do not have to come up with clever passphrases and, through using WPS-PBC (WPS-PBC: Wi-Fi Protected Setup—2.Push Button Configuration), do not even need to know the WPA (WPA: Wi-Fi Protected Access) passphrase of the AP. This further removes the need for any user interface on the bridge devices, reducing the complexity and cost even further.

Not having to perform a lot of networking functions, Wi-Fi-to-Ethernet boxes are deployed as 802.1d compliant bridges, forwarding packets transparently between the devices connected to the AP and devices connected to the STA.

The main problem to overcome with such Wi-Fi-to-Ethernet boxes is the configuration of the network credentials. Ideally, end-users do not have to be troubled with the configuration of those devices and should be capable of using the devices right out of the box. This implies that the out-of-the-box (OOB) settings must allow deploying a WLAN, which is commonly realized via "pre-pairing" two or more devices in production. An alternative is the usage of WPS-PBC configuration, which becomes applicable once the end user starts to expand his current WLAN.

However, problems arise when users start to physically alter the network. For example, when a user moves to a new home and does not know which box was the AP and which one was the STA.

This is an issue as there is an impact on the usable bandwidth and this could lead to not being able to connect to the WLAN anymore.

This is illustrated in FIGS. 1 and 2 using a Wi-Fi LAN device as an example. In the example of FIG. 1 two STA devices STA1 and STA2 are connected to an AP, which in turn is connected to a central gateway or port of a broadband network. STA1 and STA2 have the credentials of the AP and hence are allowed on the WLAN. Because the two STA devices share the WLAN bandwidth using CSMA-CA (CSMA-CA: Carrier Sense Multiple Access with Collision Avoidance), each STA device roughly gets 50% of the available air-time, provided each is using the same PHY rate (PHY rate: Physical Layer rate).

When the end user decides to physically move the devices, the scenario can change as indicated in FIG. 2. As all the devices are generic, they all look the same. As a result the end user may unknowingly connect the devices in an incorrect way. Now the STA2 device is connected to the central gateway or port of the broadband network instead of the AP. This connection error cuts the available bandwidth to 33% per STA device. The reason of this bandwidth drop is the IEEE 802.11 infrastructure mode, which does not allow STA devices to exchange data directly with each other. Instead, all packets must go through the AP.

Thanks to the pairing or pre-pairing the Wi-Fi link will still work, but there is a substantial bandwidth loss. Note that the example given still considers equal PHY rate between the clients and the AP. If this starts to change due to external influences, e.g. fading, shadowing, interference, etc., the impact becomes a lot worse.

From the scenario in FIG. 2 it is apparent that a functional role change is required. Functional role change here means that an AP becomes an STA or an STA becomes an AP. This is needed in order to restore the air-time ratio and hence the total throughput towards a client.

A role change is by preference dynamic, e.g. using a discovery mechanism such as LLDP (LLDP: Link Layer Discovery Protocol), SSDP (SSDP: Simple Service Discovery Protocol) or even DHCP (DHCP: Dynamic Host Configuration Protocol), so that an end user is not troubled with a full, manual reconfiguration. A solution for determining a role change of network devices is described, for example, in U.S. Pat. No. 7,380,025.

FIG. 3 illustrates what happens when a role change is performed. STA2 becomes a new access point AP(2) using its own set of credentials, i.e. BSSID (BSSID: Basic Service Set Identification) and WPA passphrase. The other devices can reconnect to the network, as they have been pre-paired. However, if the devices were not pre-paired, e.g. because the end user bought two separate devices, or a third device was added, or a device was replaced, the scenario of the role swap would lead to a disaster, as the other devices would not be able to reconnect to the network.

SUMMARY OF THE INVENTION

It is an object of the present invention to propose a reliable solution for automatic reconfiguration of network devices.

According to the invention, a method for preparing a first network device for automatic configuration in a network, wherein the first network device (AP, STA1, STA2) is adapted to switch from the role of access point to the role of station and vice versa, comprises the steps of:
   receiving a profile of a second network device connected to said first network device via a network, wherein the profile of the second network device comprises access point credentials of the second network device;
   comparing the received profile with existing profiles stored in a memory of said first network device; and
   storing the profile of the second network device in the memory in case the profile is not yet stored in the memory.

Accordingly, a network device adapted to switch from the role of access point to the role of station and vice versa comprises:
   an input for receiving a profile of a second network device connected to said network device via a network, wherein the profile of the second network device comprises access point credentials of the second network device;
   a memory for storing the profile of the second network device in case the profile is not yet stored in the memory; and
   a comparator for comparing the received profile with existing profiles stored in the memory of said network device.

The invention proposes a credential recovery and auto-provisioning mechanism, which is preferably implemented as a software module included in the software running on the different network devices, namely the access point and the stations. Advantageously, the devices are provided with an auto role detection, meaning they figure out what their functional role is in the WLAN. Once this has been established, the WLAN can be set up through usage of WPS-PBC. If the WLAN is operational, loss of credentials will be countered by a software application that will retrieve the profiles, which comprise the access point credentials, of all the nodes of the network, i.e. the access point and all stations in the network.

The access point and/or the stations broadcast this info to all the nodes in the network. In this way all nodes are provided with the access point security credentials of all other nodes. This ensures that the WLAN can be restored once the devices are powered up again in a different configuration. The auto provision of the network credentials functions without interference of the end user. At the same time it is a much less costly and time consuming process than pre pairing the devices in production.

Advantageously, the access point requests each newly encountered station to send its profile. This ensures that also the access point security credentials of stations joining the network at a later time are available to all nodes.

Preferably, the profiles stored in the memory are broadcast into the network with a predetermined delay between subsequent profiles. In this way the different stations have sufficient time to process the each received profile. Otherwise further profiles might be missed by a station that is still busy with storing a previous profile.

Favorably, the step of broadcasting the profiles stored in the memory into the network is repeated after a predetermined time. In this way the profiles are also made available to a device that joined the network at a later time.

In order to reconfigure a network device after powering up again in a different configuration, a method for automatically configuring a first network device, which is adapted to switch from the role of access point to the role of station and vice versa, comprises the steps of:
   determining a role change of the first network device;
   retrieving a profile of a second network device from a memory, wherein the profile of the second network device comprises access point credentials of the second network device; and
   connecting the first network device to the second network device using the retrieved profile.

Accordingly, a network device adapted to switch from the role of access point to the role of station and vice versa comprises:
   a role detector for determining a role change of the network device;
   a memory access unit for retrieving a profile of a second network device from a memory, wherein the profile of the second network device comprises access point credentials of the second network device; and
   a network connector for connecting the network device to the second network device using the retrieved profile.

When after powering up a role change is determined, i.e. the former access point determines that it now needs to operate as a station, this station retrieves the access point security credentials of the former station that now operates as an access point from its memory. Using these credentials, the station is able to connect to the new access point.

For a better understanding the invention shall now be explained in more detail in the following description with reference to the figures. It is understood that the invention is not limited to this exemplary embodiment and that specified features can also expediently be combined and/or modified without departing from the scope of the present invention as defined in the appended claims.

DETAILED DESCRIPTION OF PREFERRED EMBODIMENTS

In the following a solution according to the invention for a credential recovery and auto-provisioning mechanism is described.

Figure 1:
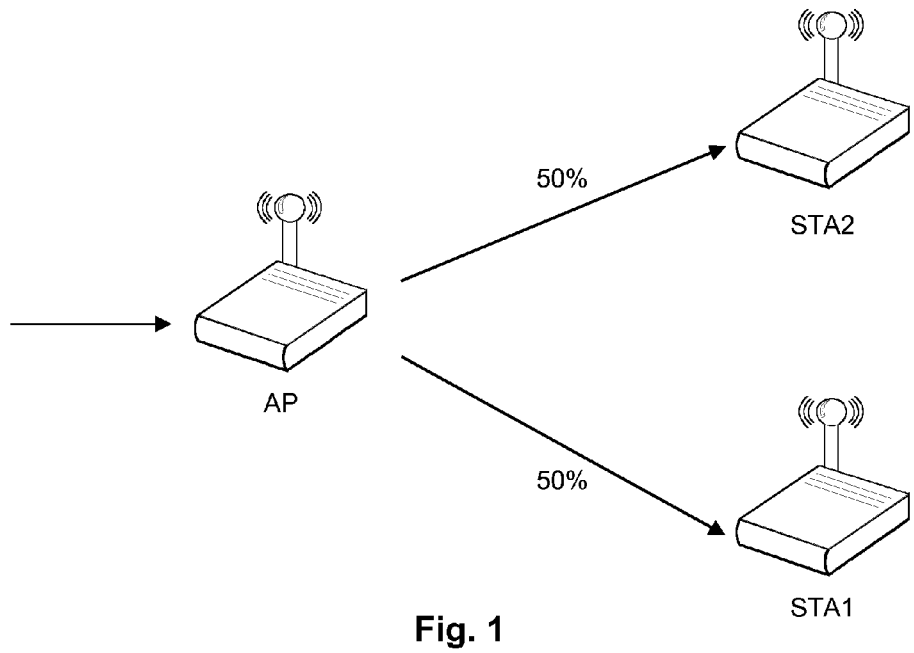
FIG. 1 shows a correctly configured network with one access point and two stations.
Figure 2:
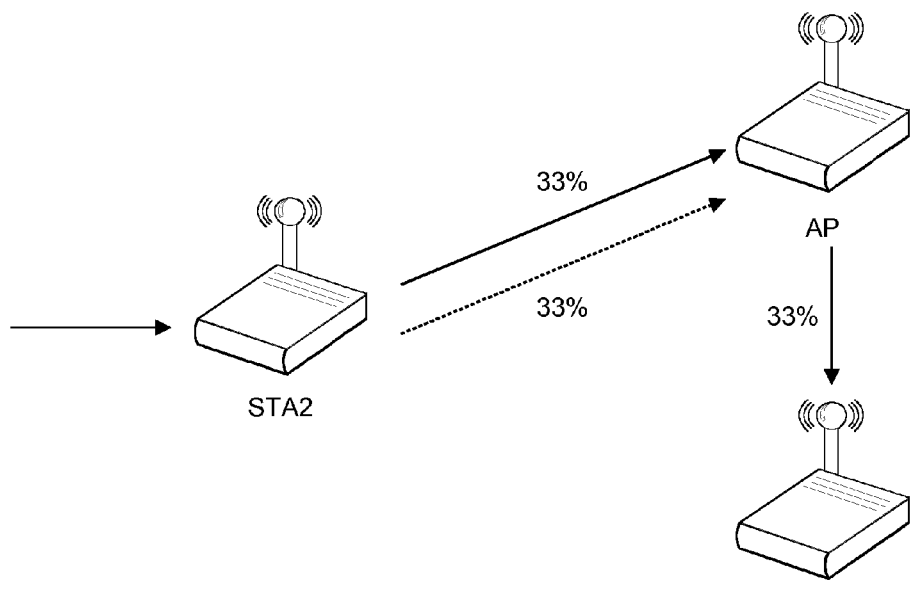
FIG. 2 depicts the network of FIG. 1 after exchanging the access point with one of the stations.
Figure 3:
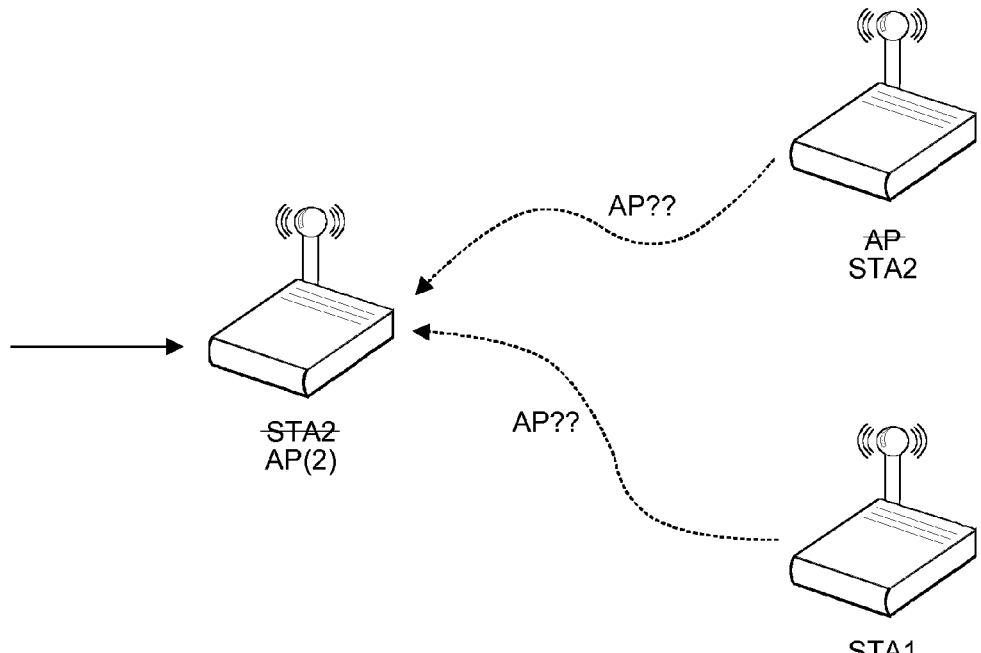
FIG. 3 illustrates a role change in the network of FIG. 2.

Considering FIG. 1 again, the scenario illustrated in this figure is the "factory default" scenario. An end user has either received three devices that can be connected in every possible way, because they have been pre-paired, or the end user has connected the devices in a random order and has correctly established the WLAN. For example, the WLAN may have been set up using the WPS-PBC method twice, i.e. once for each station STA1, STA2.

Figure 4:
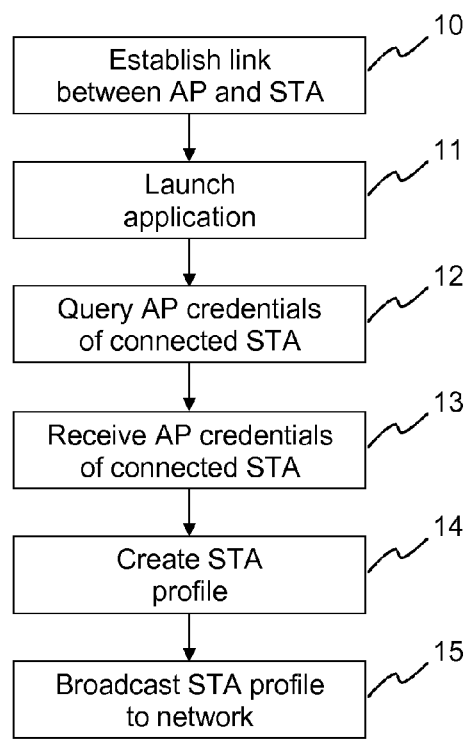
FIG. 4 illustrates a method according to the invention performed by an access point for credential retrieval and auto-provisioning.
Figure 5:
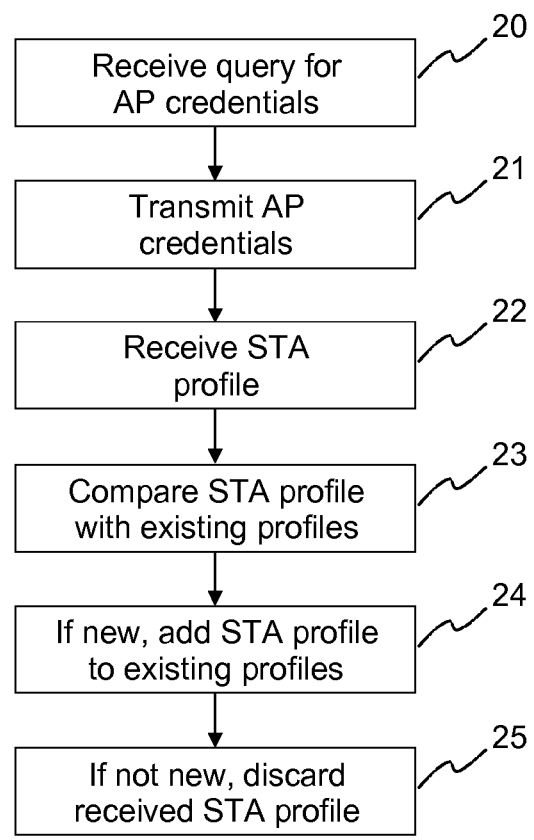
FIG. 5 depicts a method according to the invention performed by a station for credential retrieval and auto-provisioning.
Figure 6:
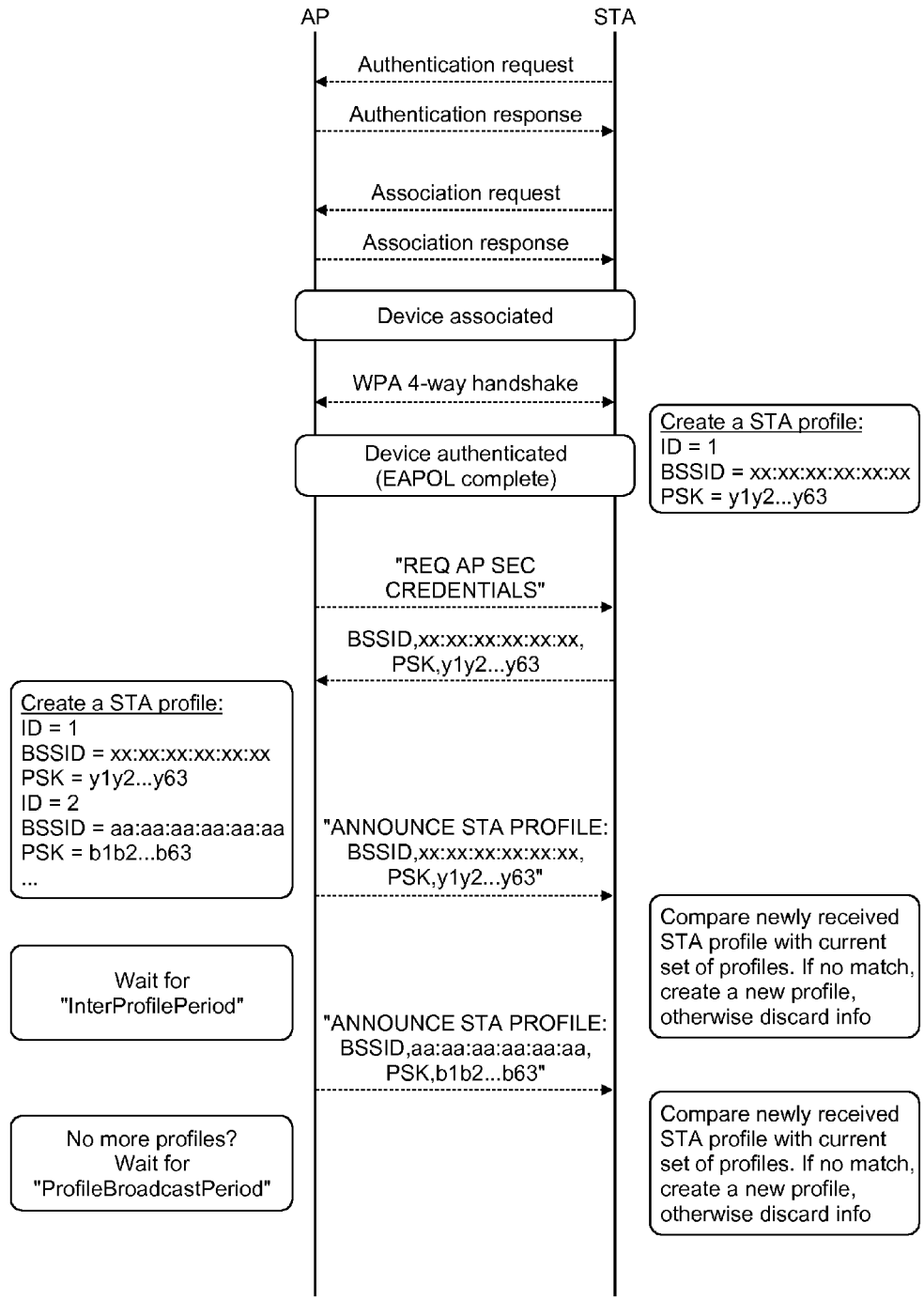
FIG. 6 shows the credential retrieval and auto-provisioning mechanism in more detail.

In FIGS. 4 and 5 methods according to the invention for credential retrieval and auto-provisioning performed by an access point and a station, respectively, are schematically illustrated. FIG. 6 shows the data exchange performed for credential retrieval and auto-provisioning in more detail. Once a link between the access point AP and a station STA1, STA2 is established 10, an application is launched 11 that queries 12 the access point credentials of the client STA1, STA2 that has connected to the access point AP. Preferably, the application uses either layer 2, i.e. the MAC-layer (MAC: Media Access Control), or layer 3, in the present example the IP-layer (IP: Internet Protocol), to communicate with the client STA1, STA2. At least layer 2 communication must be supported, because in a pure bridged network the access point AP and station devices STA1, STA2 do not need to receive an IP address. They need to have an IP address for WPS to work, but it does not need to be assigned by DHCP (DHCP: Dynamic Host Configuration Protocol).

The access point AP queries 12 the credentials from each connected station STA1, STA2 and, after receiving 13 the credentials, creates 14 station profiles, if such profiles are not yet available, and "broadcasts" 15 the credentials back into the network. Preferably, for the distribution of the credentials no real broadcast traffic will be used, as Wi-Fi does not guarantee reception of broadcast/multicast packets.

Instead, the application sends a broadcast frame, but the Wi-Fi MAC layer will convert it to a unicast frame that is directed to all stations STA1, STA2 that are present in the connection list of the access point AP.

Each time a new station connects to the access point AP, the access point AP queries 12 the station for its security credentials. After receiving 20 a query the station must reply 21 with a data frame containing a credential structure containing the BSSID and the WPA-PSK value (WPA-PSK: Wi-Fi Protected Access-Pre-shared key) or the WPA-key, should there be one. For this purpose a comma separated list is preferably used. The access point AP receiving 13 this info creates 14 a station profile containing the newly received information. An example of such a profile is a TR-181/TR98 "endpoint":

| Field | Value |
| --- | --- |
| Device.WiFi.Endpoint.{i}.Profile.SSID | BSSID of the newly learned AP |
| Device.WiFi.Endpoint.{i}.Profile.Security.ModeEnabled | WPA2-Personal WPA-WPA2-Personal |
| Device.WiFi.Endpoint.{i}.Profile.Security.PreSharedKey | WPA key of the newly learned AP |
| Device.WiFi.Endpoint.{i}.Profile.Security.KeyPassPhrase | WPA-PSK of the newly learned AP |

Once the access point AP has at least two station profiles, it starts informing the WLAN of the existing security credentials. The access point AP periodically sends 15 a profile, in a unicast data frame, to each associated device. In order to do that the access point AP is advantageously configured with two periodical inform parameters "InterProfilePeriod" and "ProfileBroadcastPeriod". InterProfilePeriod controls the time in between the broadcast of two different profiles, e.g. two seconds. ProfileBroadcastPeriod controls the time between two subsequent broadcast cycles, e.g. one minute.

Upon reception 22 of a STA profile each station STA1, STA2 compares 23 the information with the existing information in its own data model and decides to add 24 a profile or discard 25 the info.

Figure 7:
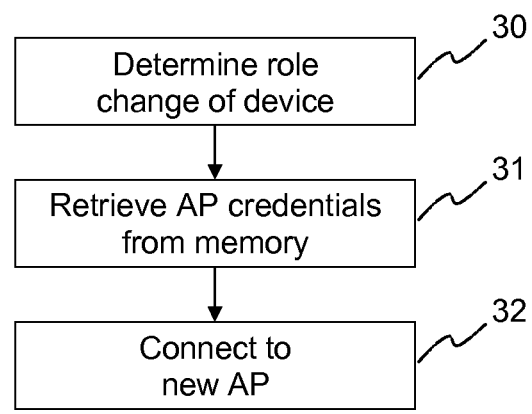
FIG. 7 illustrates a method for reconfiguring a network using the retrieved credentials, and
FIG. 8 schematically depicts a network device according to the invention.

Once all nodes AP, STA1, STA2 of the WLAN have each other's credentials stored in their respective data models an end user is safely allowed to disconnect the devices AP, STA1, STA2 and reconnect them in a random order. The auto role detection will guarantee that the access point AP remains connected to the gateway and that the WLAN can be set up as all nodes have the correct security credentials. A method for reconfiguring the network using the retrieved credentials is illustrated in FIG. 7. When a role change of the access pointe AP is determined 30, the profile of the new access point AP(2) is retrieved 31 from a memory. Using the credentials stored in this profile, the former access point, which no functions as a station, can connect 32 to the new access point AP(2).

Figure 8:
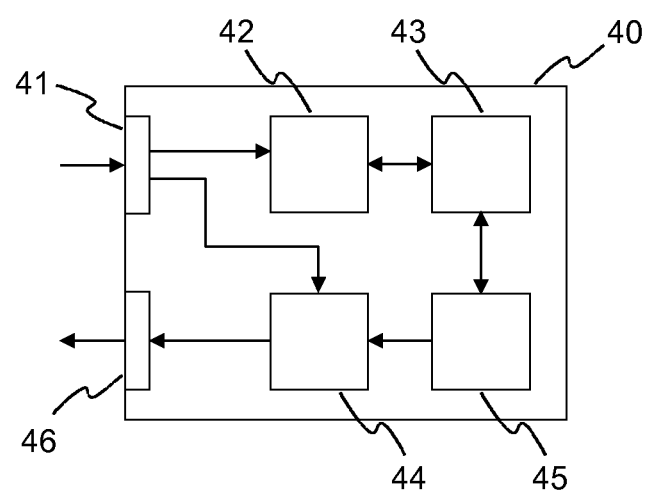

FIG. 8 schematically depicts a network device 40 according to the invention. The network device 40 comprises an input 41 for receiving profiles of other network devices and a memory 43 for storing these profiles. A comparator 42 compares the received profiles with existing profiles stored in the memory 43 in order to avoid double entries in the memory. The device 40 further comprises a role detector 44 for determining a role change of the network device 40, e.g. a change from the role of "access point" to the role of "station". In case a role change is determined, a memory access unit 45 retrieves a profile of a second network device AP(2) from the memory 43. Using the retrieved profile, a network connector 46 connects the network device AP to the second network device AP(2).

The invention claimed is:

1. A method for preparing a first network device for automatic configuration in a network comprising an access point and a plurality of stations, wherein the first network device is adapted to switch from the role of access point to the role of station and vice versa, the method comprising, when the first network device has the functional role of the access point in the network:

receiving a profile of at least one second network device connected to said first network device, wherein the second network device is adapted to switch from the role of station to the role of access point in the network and vice versa, the profile of the second network device comprising access point credentials of the second network device in the network;

comparing the received profile with existing profiles stored in a memory of said first network device; and storing the profile of the second network device in the memory in case the profile is not yet stored in the memory, wherein the first network device and the second network device are provided with an auto role detection allowing each of them to detect its functional role in the network being either an access point or a station, wherein the method further comprises:

determining a role change of the first network device from the role of access point to the role of station and identifying that one of the at least one second network device operates as a new access point;

retrieving the profile of the second network device operating as a new access point from the memory; and connecting the first network device to the second network device using the access point credentials of the second network device within the retrieved profile.

2. The method according to claim 1, further comprising broadcasting profiles stored in the memory into the network.

3. The method according to claim 2, wherein the profiles stored in the memory are broadcast into the network with a predetermined delay between subsequent profiles.

4. The method according to claim 2, wherein broadcasting the profiles stored in the memory into the network is repeated after a predetermined time.

5. The method according to claim 2, wherein a broadcast frame is sent and converted into a unicast frame directed to all the stations connected to the access point.

6. A first network device adapted to switch from the role of access point to the role of station and vice versa in a network comprising an access point and a plurality of stations, wherein the first network device comprises:

an input configured to receive a profile of at least one second network device connected to said first network device via the network, the second network device being adapted to switch from the role of station to the role of access point and vice versa, wherein the profile of the second network device comprises access point credentials of the second network device;

a memory configured to store the profile of the second network device in case the profile is not yet stored in the memory; and a comparator configured to compare the received profile with existing profiles stored in the memory of said first network device, a role detector configured to determine a role change of the first network device from the role of access point to the role of station and for identifying that one of the at least one second network device operates as a new access point;

a memory access unit configured to retrieve the profile of the second network device operating as a new access point from the memory; and a network connector configured to connect the first network device to the second network device using the access point credentials of the second network device within the retrieved profile.

7. The access point according to claim 6, wherein the access point is further configured to broadcast profiles stored in the memory into the network.

8. The access point according to claim 7, wherein the access point is further configured to broadcast the profiles stored in the memory into the network with a predetermined delay between subsequent profiles.

9. The access point according to claim 7, wherein the access point is further configured to repeat broadcasting the profiles stored in the memory into the network after a predetermined time.

* * * * *